Nov. 21, 1961 M. S. RIDDIFORD ET AL 3,010,065

SEARCH RECEIVER

Filed June 6, 1958 6 Sheets-Sheet 1

Inventors
Milton Riddiford
John J. Pakan
Joseph S. Naber
By: Graf, Nierman & Burmeister
Attorneys Inventors
Milton Riddiford
John J. Pakan
Josehp S. Naber
By: Graf, Nierman & Burmeister
Attorneys Inventors
Milton Riddiford
John J. Pakan
Joseph S. Naber
By: Graf, Nierman & Burmeister
Attorneys Nov. 21, 1961 M. S. RIDDIFORD ET AL 3,010,065

SEARCH RECEIVER

Filed June 6, 1958

6 Sheets-Sheet 4

Inventors
Milton Riddiford
John J. Pakan
Joseph S. Naber
By: Graf, Nierman & Burmeiter
Attorneys Nov. 21, 1961 M. S. RIDDIFORD ET AL 3,010,065

SEARCH RECEIVER

Filed June 6, 1958 6 Sheets-Sheet 5

Inventors
Milton Riddiford
John J. Pakan
Joseph S. Naber

By: Graf, Nierma & Burmeister
Attorneys

Inventors
Milton Riddiford
John J. Pakan
Joseph S. Naber
By: Graf, Nierman & Burmeister
Attorneys United States Patent Office 3,010,065 Patented Nov. 21, 1961

3,010,065

SEARCH RECEIVER

Milton S. Riddiford, Raton, N. Mex., and John J. Pakan, Elmwood Park, and Joseph S. Naber, Wheeling, Ill., assignors to A.R.F. Products, Inc., River Forest, Ill., a corporation of Illinois Filed June 6, 1958, Ser. No. 740,497
9 Claims. (Cl. 324—68)

The present invention relates generally to search receivers, and more particularly to devices for automatically selecting a particular frequency from a predetermined frequency spectrum.

In one type of search receiver, a tuning assembly is motor driven to sweep a particular frequency spectrum. The output of the search receiver is connected to a display device in the form of an oscilloscope. The sweep frequency of the oscilloscope is synchronized with the sweeping rate of the tuning assembly, so a particular frequency appears as a vertical spike on the oscilloscope. If it is desired to examine in detail a particular signal appearing on the oscilloscope, the motor driving the tuning assembly is deactuated, and the receiver manually tuned to the signal to be examined.

More recently, a clutch has been positioned between the manual tuning means and the tuning assembly of search receivers in order to facilitate the examination of particular signals within the frequency spectrum of the search receiver. The patent of Joseph F. Curran, No. 2,590,844, discloses a clutch mechanism for this purpose. Further, efforts have been made to provide means for stopping the sweeping of the tuning assembly at the frequency of the signal which is to be further observed. Prior to the present invention, a separate oscillator was mechanically linked with the manual tuning mechanism of the receiver and electrically coupled to the oscilloscope. It was then possible to tune the manual tuning means while the tuning assembly was rotating under power from the motor to bring the visual response of the auxiliary oscillator into coincidence with the signal to be observed. Since the clutch disclosed in the Curran patent always engages in the same rotational relationship, the tuning assembly of the search receiver can thus be expected to stop rotation at the frequency of the signal to be observed.

Search receivers of this type, however, are costly to construct, since an auxiliary oscillator virtually identical to the oscillator of the search receiver is required. Further, the auxiliary oscillator must be perfectly tracked with the oscillator of the search receiver in order to achieve the desired correlation between the frequency of the observed signal and the visual indication of the setting of the manual tuning means of the search receiver. At higher frequencies, it has been extremely difficult to accomplish this correlation.

It is one of the objects of the present invention to provide a search receiver with a motor driven tuning assembly which is mechanically coupled to a manual frequency selector through a clutch which includes mechanical means for generating an electrical signal for correlating the angular position of the manual frequency selector with a response frequency of the tuning assembly.

It is a further object of the present invention to provide a search receiver with a motor driven tuning assembly which is mechanically coupled to a manual frequency selector through a clutch which includes a magnetic pulse generator having a pickup portion and an actuator portion, the pickup portion being mounted to one member of the clutch and the actuating portion mounted to the other member of the clutch in order to generate an electrical signal for correlating the angular position of the manual frequency selector with a response frequency of the tuning assembly.

A search receiver constructed according to the present invention employs a receiver with frequency determining circuits mechanically coupled to a motor and also to a manual tuning means through a two member clutch which includes means to orient the members in the same rotational positions whenever engaged. The clutch has a two element electromechanical transducer, one of the elements of the transducer being mounted to each of the members of the clutch to produce an electrical response for each rotation of the members of the clutch relative to each other. The time difference between each pulse generated by the electromechanical transducer and the pulse generated in the same revolution of the clutch members to any signal detected is thus an indication of the difference between manual tuning frequency and the frequency of the detected signal.

A more complete understanding of these objects and additional objects will be had from a further reading of this disclosure, particularly when viewed in the light of the drawings, in which.

Figure 1:
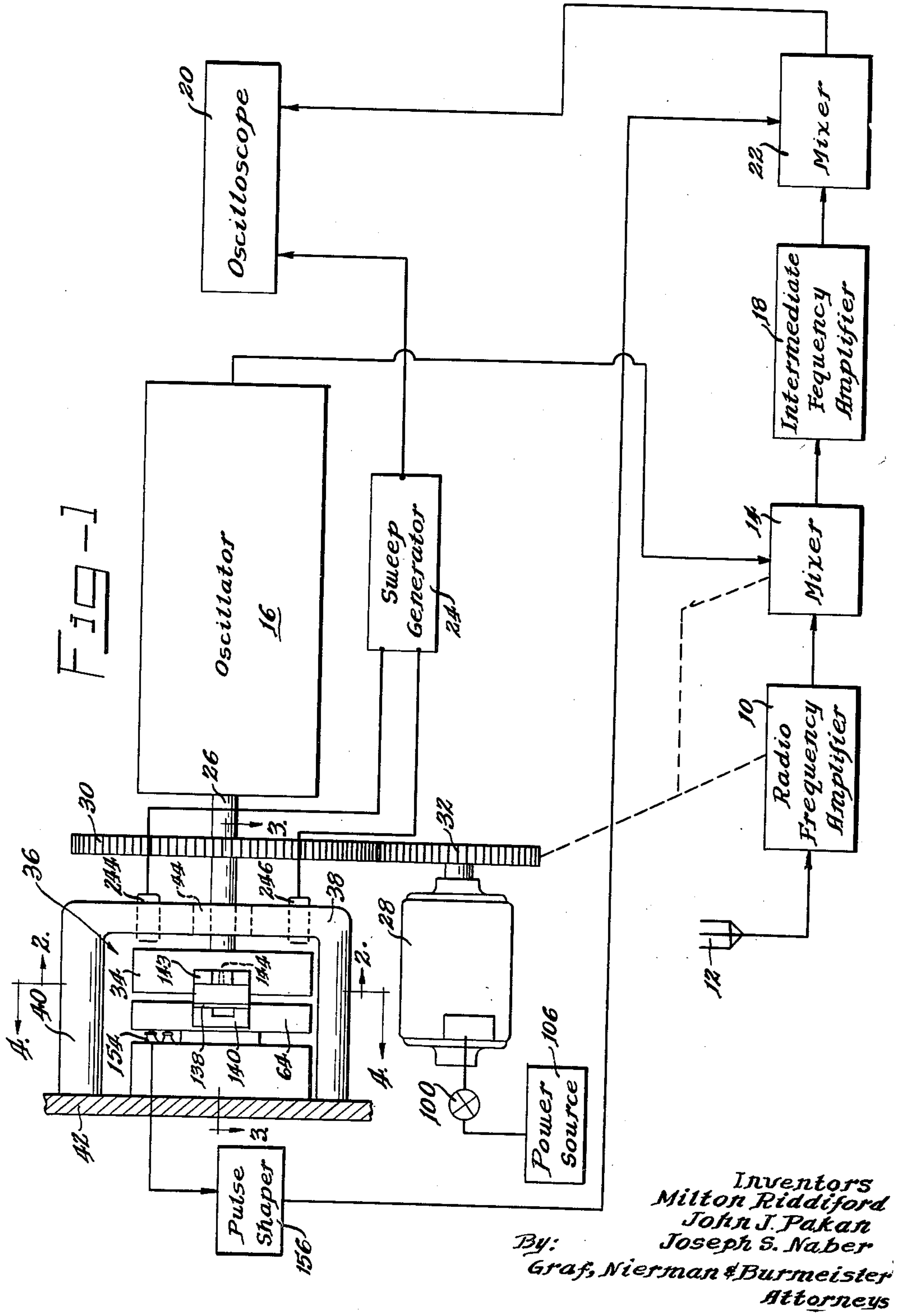
FIGURE 1 illustrates a search receiver constructed according to the teachings of the present invention, a portion of the receiver being shown in plan view and a portion being shown in schematic electrical block diagram.

FIGURE 1 illustrates a search receiver employing the present invention. The receiver utilizes a radio frequency amplifier 10 which is connected to an antenna 12. The output of the radio frequency amplifier 10 is connected to a mixer 14 which is also electrically connected to an oscillator 16. The output of the mixer 14 is connected to an intermediate frequency amplifier 18, and the output of the intermediate frequency amplifier 18 is connected to the vertical deflection terminals of an oscilloscope 20 through a mixer 22. A sweep generator 24 which produces a saw tooth pulse for each sweep of the frequency spectrum by the search receiver is connected to the horizontal deflection terminals of the oscilloscope 20, and will be further described hereinafter.

The oscillator 16 has a frequency determining shaft 26 which is coupled to a motor 28 by spur gears 30 and 32 secured to the shaft 26 and motor 28, respectively. The frequency determining shafts of the radio frequency amplifier 10 and mixer 14 are also coupled to the motor 28, as indicated by the dashed lines, so that the amplifier 10, mixer 14, and oscillator 16 together form the tuning assembly for the search receiver.

Figure 3:
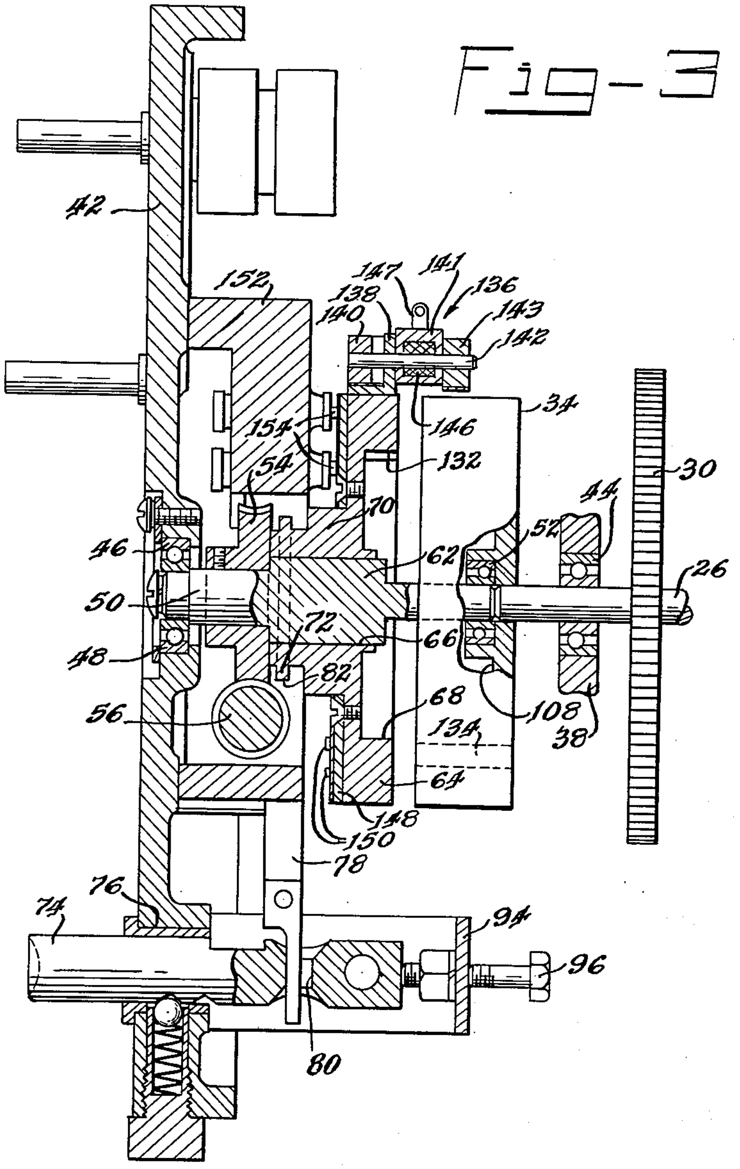
FIGURE 3 is a sectional view taken along the line 3—3 of FIGURE 1.

As best illustrated in FIGURE 3, the shaft 26 of the oscillator 16 is also directly connected to the rotor 34 of a clutch assembly 36. The rotor 34 is rotatably mounted to a yoke-shaped support 38 which has three outwardly extending legs 40 which are attached to a front panel 42 for the search receiver, as illustrated in FIGURE 1. The clutch support 38 mounts a bearing 44 which journals the shaft 26.

A second bearing 46 is mounted in an aperture 48 in the panel 42 confronting the first bearing 44 mounted in the support yoke 38. A second shaft, or axle, 50 is journalled in the bearing 46 and extends to a third bearing 52 mounted to the rotor 34 and aligned with the first and second bearings 44 and 46, and the shaft 50 is journalled in the third bearing.

A worm gear 54 is secured to the second shaft 50 adjacent to the panel 42, and a worm shaft 56 is meshed with the worm gear 54 and rotatably mounted to the panel 42. The worm shaft 56 is coupled to a tuning shaft 58 through a gear train 60, illustrated in FIGURE 4.

The second shaft 50 has a rectangular central portion 62 which extends toward the rotor 34 of the clutch assembly 36 from the worm gear 54, and a disc 64 with a rectangular axial bore 66 is translatably disposed about the rectangular portion 62 of the second shaft 50. The disc 64 has an indentation 68 confronting the rotor 34, and a hub 70 with an outwardly extending ridge 72 disposed about the axis of the disc 64 confronting the worm gear 54.

Figure 5:
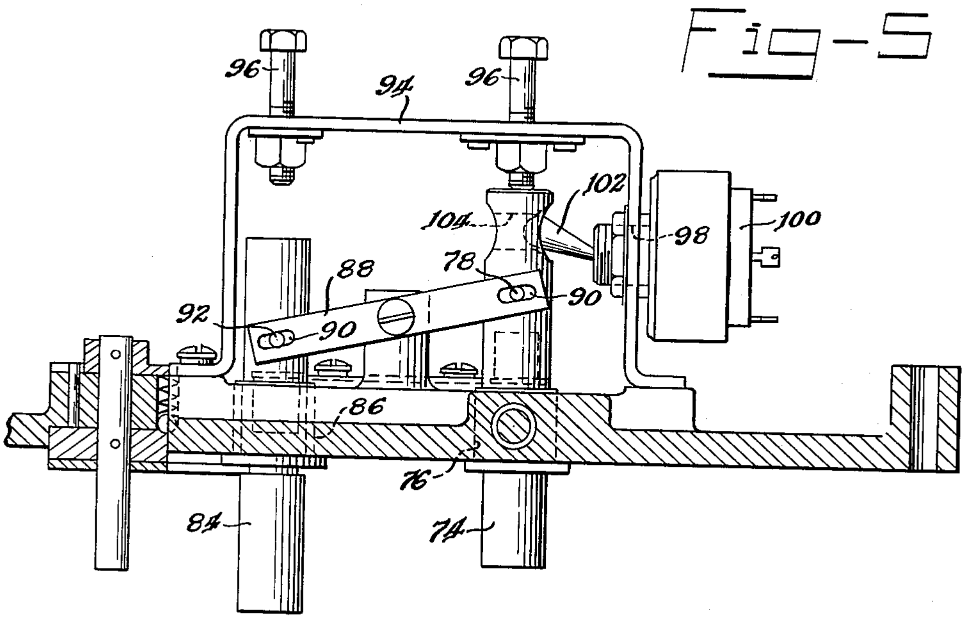
FIGURE 5 is a sectional view taken along the line 5—5 of FIGURE 4.

A selection button 74 is mounted through an aperture 76 in the panel 42, and a fork 78 is pivotally mounted to the panel 42 at its center and extends at one end through an aperture 80 in the button 74. The other end of the fork 78 has a slot 82 which engages the ridge 72 in the hub 70. A second button 84, illustrated in FIGURES 4 and 5, extends through an aperture 86 in the panel 42 adjacent to the aperture 76 on a plane generally normal to the fork 78. A lever 88 is pivotally mounted to the panel 42 at its center and provided with slots 90 at each end. One of the slots 90 engages the end of the fork 78, and the other slot 90 engages a pin 92 which extends through the second button 84. As illustrated, the button 74 has been depressed, thereby translating the disc 64 toward the panel 42 which is the position for motor driving of the tuning assembly. When the button 84 is depressed, the disc 64 is translated toward the rotor 34, and the button 74 is translated outwardly.

A bracket 94 is also mounted to the panel 42 and extends around the buttons 74 and 84. The bracket 94 threadedly engages a pair of stop screws 96 which are aligned with the buttons 74 and 84 to stop the travel of the buttons. The bracket 94 is also provided with an aperture 98 in a portion thereof parallel to the button 74 and adjacent thereto, and a switch 100 is mounted in the aperture 98. The switch 100 has a toggle control member 102 which is disposed within a bore 104 adjacent to the end of the button 74, so that translation of the button 74 actuates the switch 100. The switch 100 is connected between a power source 106 and the electric motor 28 to control the energization of the motor, as shown in FIGURE 1.

Figure 2:
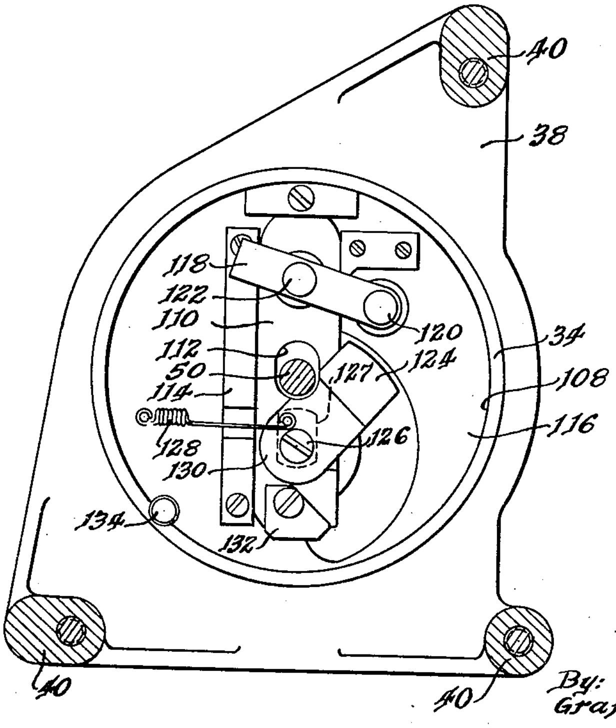
FIGURE 2 is a sectional view taken along the line 2—2 of FIGURE 1.

As illustrated in FIGURES 2 and 3, the rotor 34 has an annular indentation 108 about its axis. As shown in FIGURE 2*a*, slide plate 110 with a slot 112 is mounted slideably within the indentation 108 with the slot 112 disposed about the shaft 50. The slide plate 110 is confined to translation along a given axis by a retaining strip 114 and a retaining plate 116. A stop lever 118 is pivotally mounted at one end by a pin 120, and pivotally attached at its central portion to the slide plate 110 by a pin 122. A second lever 124 is pivotally attached at one end to the slide plate 110 by a pin 126 which extends through a slot 127 in the slide plate 110, and biased toward the slot 112 by a spring 128. The lever 124 has a rounded surface at the end adjacent to the pin 126, designated 130, and this surface abuts a block 132. As a result, rotation of the rotor 34 causes the end of the lever 124 opposite the pin 126 to move toward the periphery of the rotor 34, thereby causing the lever 124 to abut the block 132 sliding the slide plate 110. As a result, the lever 118 moves toward the shaft 50.

The lever 118 protrudes from the rotor 34 to rotate within indentation 68 of the disc 64. As illustrated in FIGURE 3, the disc 64 is provided with a notch 132 which accommodates the lever 118 during periods when the rotor is not being driven by the motor 28. As a result, the rotor 34 and the disc 64 are maintained in the same angular positions relative to each other during all periods in which the motor 28 is not energized.

Figure 4:
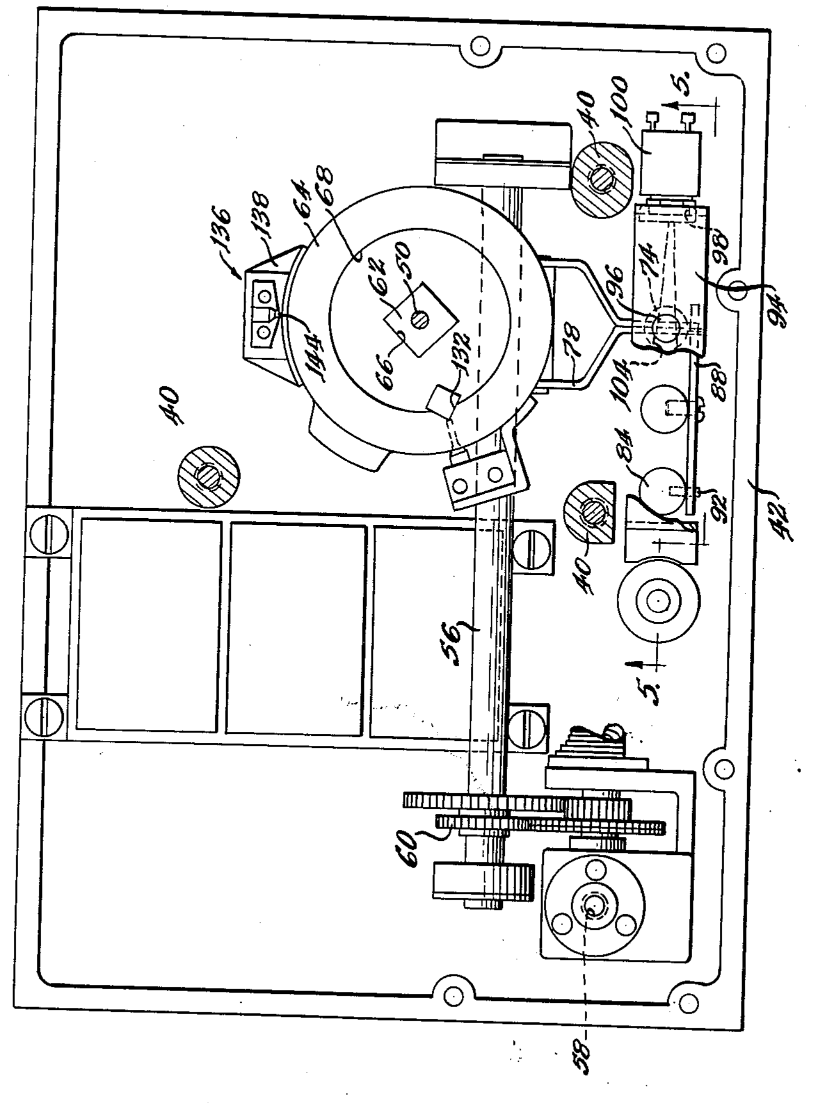
FIGURE 4 is a sectional view taken along the line 4—4 of FIGURE 1.

A bar 134 of magnetically permeable material, such as cold rolled steel, is mounted in the periphery of the rotor 34, the rotor 34 itself being constructed of material with a relatively low magnetic permeability, such as aluminum, or brass. Further, a magnetic pickup assembly 136, illustrated in FIGURES 1, 2 and 4, is mounted to the periphery of the disc 64. The pickup assembly 136 is secured to the disc 64 by a mounting bracket 138 which positions the assembly 136 to confront the rotor 34. The pickup assembly includes a bar magnet 140 mounted on the side of the bracket 138 remote from the rotor. A coil assembly 141 is mounted by a pair of ferromagnetic bolts 142 to the opposite side of the bracket 138, and a pair of magnetic pole pieces 143 are mounted adjacent to the coil assembly 141 by the bolts 142. The pole pieces 143 form a magnetic gap 144. The coil assembly contains a pair of coils 146 which are disposed about the two bolts 142, and the coils are serially connected and provided with terminal lugs 147.

As illustrated in FIGURE 3, a contact plate 148 of electrically insulating material is mounted to the disc 64, and provided on its exposed surface with a plurality of coaxial electrically conducting rings 150. Two of the rings 150 are connected to the coils 146 of the assembly 136. A mounting bracket 152 is secured to the panel 42, and positions a spring biased contact 154 in abutment with each of the coaxial rings 150. As a result, the coils 146 are connected to the stationary contacts in all positions of the disc 64.

As illustrated in FIGURE 1, the coils 146 are connected to a pulse shaper 156, and the pulse shaper is connected to the mixer 22. As a result, the signal impressed by the mixer 22 on the vertical deflection elements of the oscilloscope 20 includes the pulses appearing in the output of the pulse shaper as well as signals received by the antenna 12.

Figure 6:
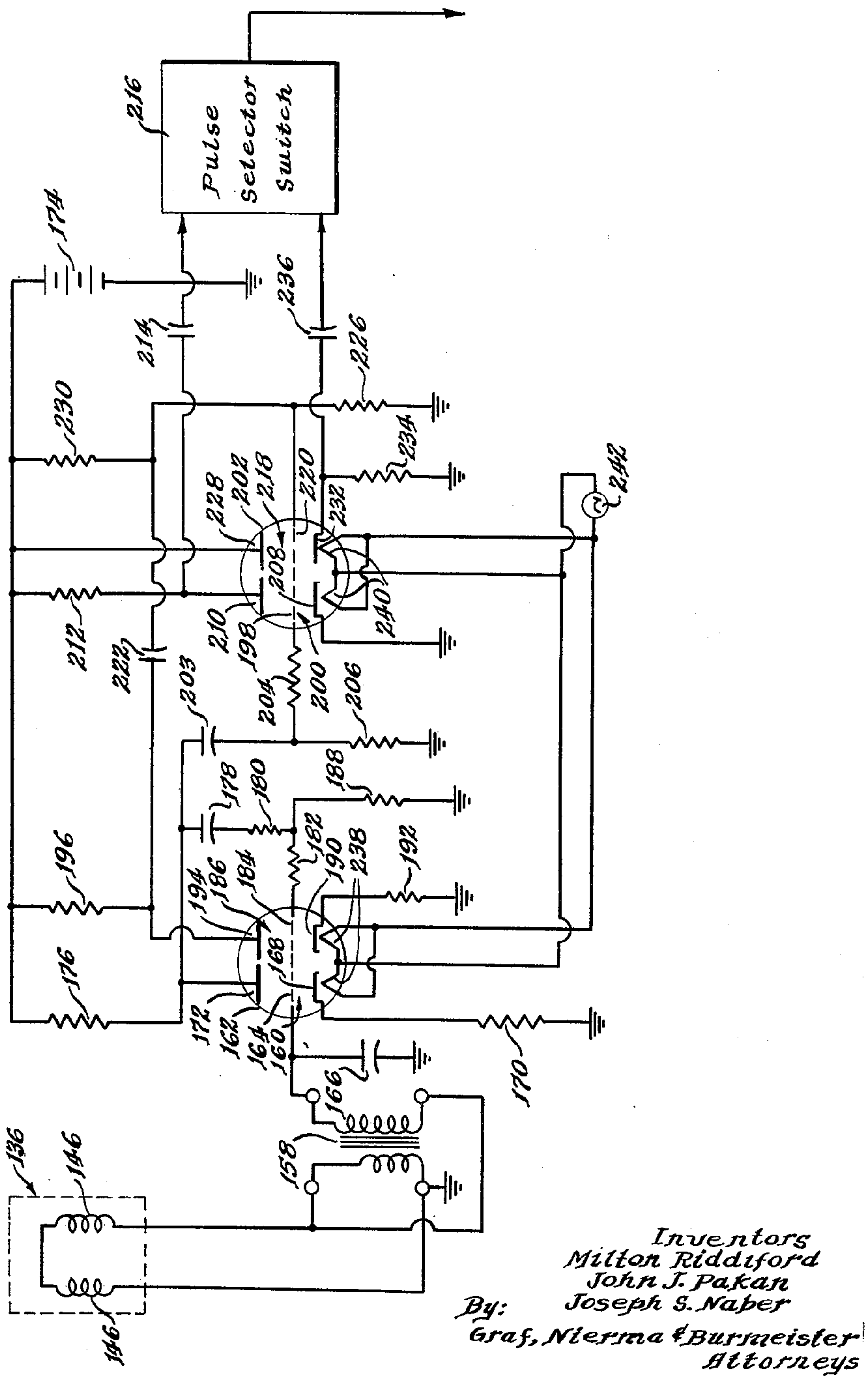
FIGURE 6 is a schematic electrical circuit diagram of the pulse shaper illustrated in FIGURE 1.

The pulse shaper circuit is illustrated in FIGURE 6. The serially connected coils 146 of the pickup assembly 136 are connected to a pulse transformer 158. The pulse transformer 158 is connected to one section 160 of a dual triode 162. This section 160 is operated as an amplifier, and has a grid 164 connected to the secondary of the transformer 158 and to a common ground connector through a capacitor 166. The section 160 also has a cathode 168 connected to the ground connector through a resistor 170, and a plate 172 connected to the positive terminal of a power source, such as the battery 174, through a plate resistor 176.

The plate 172 of section 160 of the tube 162 is coupled through a capacitor 178, resistor 180 and second resistor 182 to a grid 184 of the second triode section 186 of vacuum tube 162. The junction between resistors 180 and 182 is connected to ground by a resistor 188. The second tube section 186 also has a cathode 190 connected to ground through a resistor 192, and a plate 194 connected to the positive terminal of the power source 174 through a plate resistor 196. The amplifier employing section 160 overdrives the stage employing section 186, to permit the stage to operate as an amplifier and limiter.

The pulse shaper 156 produces both broad and narrow pulses, the narrow pulses being employed for greater definition. The amplifier and limiter circuit employing tube section 186 is used for the broad pulses only.

The plate 172 of tube section 160 is coupled to a grid 198 of vacuum tube section 200 of a dual triode vacuum tube 202 through a capacitor 203 and resistor 204, the section 200 operating as a limiter and differentiator. The junction between capacitor 203 and resistor 204 is connected to ground through a resistor 206. Vacuum tube section 200 has a cathode 208 connected directly to ground, and a plate 210 connected to the positive terminal of the power source 174 through a resistor 212. A capacitor 214 is connected to the plate 210 of vacuum tube section 200, and forms the wide marker output. The resistor 212 and capacitor 214 form a differentiating circuit which produce the wide output differentiated marker pulse. The capacitor 214 is connected to a pulse selector switch 216 which is connected to the mixer 22 to select the wide or narrow marker pulse from the pulse shaper 156.

The second section 218 of the dual triode vacuum tube 202 is employed to shape the narrow marker pulses, and has a grid 220 connected through a capacitor 222 to the plate 194 of vacuum tube section 186, and to ground through a resistor 226. The plate 228 of vacuum tube section 218 is directly connected to the positive terminal of the power source 174, this stage operating as a cathode follower. The grid 220 also is connected to the positive terminal of the power source 174 through a resistor 230. The cathode 232 of vacuum tube section 218 is connected to ground through a resistor 234, and to the pulse selector switch 216 through capacitor 236. The heaters 238 of vacuum tube 162 and 240 of vacuum tube 202 are connected to a power source 242.

The capacitor 222 and resistor 226 form a differentiating circuit in the grid of the cathode follower stage employing vacuum tube section 218. In addition, the amplifier stage employing vacuum tube section 186 overdrives the cathode follower, to clip the resulting pulse to approximately half its amplitude. In this manner, a very narrow pulse is produced and impressed upon the oscilloscope 20.

The following table sets forth the values of the electrical components employed in the pulse shaper 156.

*Table I*

| | |
|---|---|
| Vacuum tube 162 | 12AT7. |
| Vacuum Tube 202 | 12AT7. |
| Capacitor 166 | 4,700 micro-microfarads. |
| Resistor 170 | 220 ohms. |
| Power source 174 | 250 volts. |
| Resistor 176 | 47,000 ohms. |
| Capacitor 178 | 10,000 micro-microfarads. |
| Resistor 180 | 330,000 ohms. |
| Resistor 182 | 470,000 ohms. |
| Resistor 188 | 68,000 ohms. |
| Resistor 192 | 100 ohms. |
| Resistor 192 | 47,000 ohms. |
| Capacitor 203 | 10,000 ohms. |
| Resistor 204 | 100,000 ohms. |
| Resistor 206 | 4.7 megohms. |
| Resistor 212 | 22,000 ohms. |
| Capacitor 214 | 470 micro-microfarads. |
| Capacitor 222 | 1,500 micro-microfarads. |
| Resistor 226 | 22,000 ohms. |
| Resistor 230 | 230,000 ohms. |
| Resistor 234 | 2,200 ohms. |
| Capacitor 236 | .47 microfarad. |
| Power source 242 | 6.3 volts alternating current. |

As illustrated in FIGURE 1, a pair of magnetic pickups 244 and 246 are mounted in the yoke support 38 of the clutch assembly 36 confronting the periphery of the rotor 34, and hence the bar 134 of magnetically permeable material. The pickups 244 and 246 are of similar construction electrically to the pickup assembly 136 and produce electrical pulses for each revolution of the rotor 34. The pulses produced by the pickups 244 and 246 are impressed upon the sweep generator 24, one of the pulses of each revolution starting the sweep cycle and the other pulse terminating it. In this manner, the output of the sweep generator 24 is always synchronized with the rotation of the rotor 34, and hence the instantaneous frequency of the search receiver.

Figure 7:
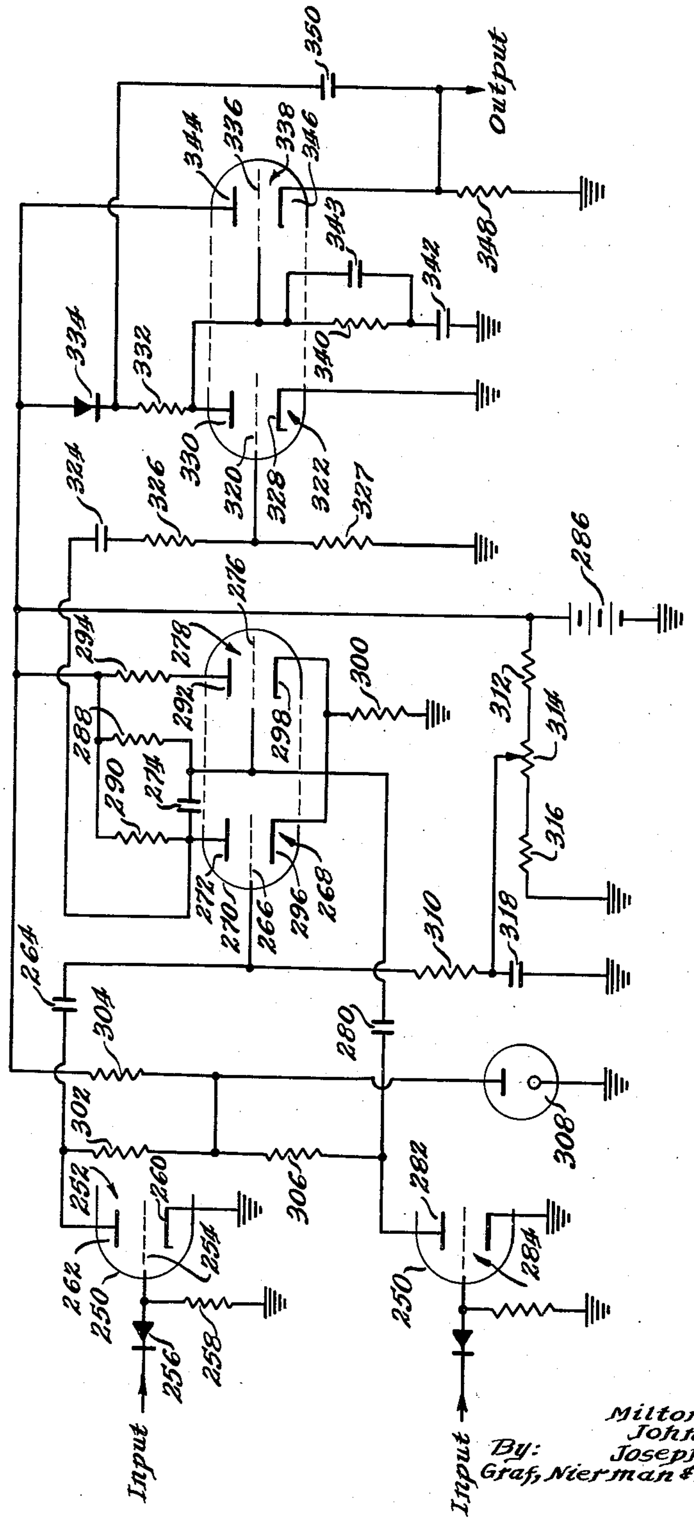
FIGURE 7 is a schematic electrical circuit diagram of the sweep generator shown in FIGURE 1.

The sweep generator is illustrated in FIGURE 7. It employs two input amplifiers using a dualtriode vacuum tube 250, the one triode section 252 having a grid 254 coupled to the electromagnetic transducer 244 through a crystal diode 256, so that negative pulses are impressed upon the grid 254 in response to the position of the rotor 34. A resistor 258 is connected between the grid 254 and ground, and the cathode 260 of vacuum tube section 252 is also connected to ground. The plate 262 of the amplifier is coupled through a capacitor 264 to the grid 266 of one section 268 of a dual triode vacuum tube 270. The vacuum tube 270 is connected in a monostable multivibrator circuit. The plate 272 of vacuum tube section 268 is coupled through a capacitor 274 to the grid 276 of the other vacuum tube section 278 of the tube 270, and the grid 276 is coupled through a capacitor 280 to the plate 282 of vacuum tube section 284 of vacuum tube 250. Vacuum tube section 284 is connected in an amplifier circuit identical to that of the circuit of vacuum tube section 252, and this amplifier circuit is connected to the electromechanical transducer 246 positioned on the yoke support of the clutch assembly and transmits the stopping pulse for the sweep generator.

The grid 276 of the multivibrator is connected to the positive terminal of a power source 286 through a resistor 288. Also, the plate 272 of vacuum tube section 268 is connected to the positive terminal of the power source 286 through a resistor 290, and the plate 292 of vacuum tube section 278 is connected to the positive terminal of the power source 286 through a resistor 294. The cathodes 296 of vacuum tube section 268 and 298 of vacuum tube section 278 are interconnected and connected to the negative terminal of the power source and ground through a resistor 300. Also, the plate 262 of the vacuum tube section 252 is connected to the positive terminal of the power source 286 by serially connected resistors 302 and 304, the plate 282 of vacuum tube section 284 being connected to the junction between these resistors through a resistor 306. A voltage regulator tube 308 is connected between the junction of resistors 302 and 304 and ground.

The grid 266 of the multivibrator is maintained at proper potential by connecting it to a tap of a voltage divider through a resistor 310, the voltage divider being formed by resistor 312, potentiometer 314, and resistor 316 serially connected between the positive terminal of the power source 286 and ground. A capacitor 318 is connected between the tap of resistor 314 and ground.

The plate 272 of vacuum tube section 268 is coupled to the grid 320 of vacuum tube section 322 through a capacitor 324 and a resistor 326 connected in series, a resistor 327 being connected between the grid 320 and ground. Vacuum tube section 322 is connected in a gating circuit. The cathode 328 of vacuum tube section 322 is connected directly to ground, and the plate 330 is connected to the positive terminal of the power source 286 through a resistor 332 and a diode 334 connected to pass positive charges toward the plate 330. The plate 330 is also directly connected to the grid 336 of vacuum tube section 338, and to a charging circuit having a resistor 340 and capacitor 342 connected in series between the plate 330 and the ground connector. A by-pass capacitor 343 is connected in parallel with the resistor 340. The plate 344 of vacuum tube section 338 is connected to the positive terminal of the power source 286, and the cathode 346 of vacuum tube section 338 is connected to ground through a resistor 348. A capacitor 350 is also connected between the cathode 346 and the junction of resistor 332 and diode 334. The cathode 346 forms the output terminal for the sweep generator.

A pulse from the starting electromechanical transducer 244 is impressed upon vacuum tube section 252 and amplified. Normally vacuum tube section 278 of the multivibrator is conducting, however, vacuum tube section 268 becomes conducting when a pulse is transmitted thereto from the starting electromechanical transducer 244 through vacuum tube section 252. During the period of conduction by vacuum tube section 268, a signal is impressed upon the grid 320 of the gating circuit and capacitor 342 is charged linearly with time. The magnitude of the potential appearing across the capacitor 342 is reflected in the potential across the resistor 348 in the cathode circuit of vacuum tube section 338, which constitutes the output of the sweep generator. A pulse from the stopping transducer 246 impressed upon the grid 276 of the multivibrator through vacuum tube section 284 causes vacuum tube section 278 to immediately conduct, hence, terminating the sweep cycle.

To operate the search receiver set forth in the figures, power is applied to the electronic components in the conventional manner. The button 74 is then depressed to close the switch 100 and apply power to the shaft 26 from the motor 28. Depressing the button 74 also disengages the rotor 34 and the disc 64 as a result of translation of the disc 64 away from the rotor 34 so that the lever 118 is disengaged from the notch 132. Hence, the rotor 34 is free to rotate without constraint by the manual tuning mechanism.

Those signals detected by the search receiver while power driven result in spikes appearing on the oscilloscope 20 because of the fact that the sweep generator 24 and frequency controlling circuits of the receiver are synchronized. A separate spike appears on the oscilloscope 20 to indicate the frequency to which the mechanical tuning mechanism is tuned. This spike results from synchronization of the response from the pickup 136 and the sweep generator 24. Since the mechanical tuning mechanism may be actuated during periods of the motor driven operation of the receiver, the spike from the manual tuning mechanism may be varied as desired.

In order to investigate one of the signals detected by the search receiver during motor driven operation, the manual tuning mechanism is adjusted to bring the spike on the oscilloscope 20 representing the frequency of the manual tuning means into coincidence with the spike representing the frequency of the detected signal. The button 84 is then depressed opening the motor switch 100 and translating the disc 64 toward the rotor 34. Because of the fact that rotation of the rotor 34 pivots the stop lever 118 of the rotor 34 toward the axis thereof, the disc 64 is free to translate toward the rotor 34 under these conditions so that the stop lever 118 rotates in a path confronting the indentation 132 of the disc 64. As the speed of the rotor 34 declines, the lever 124 is pivoted inwardly against the centrifugal force by the spring 128, and this results in the stop lever 118 engaging the inner surface of the rotor 34 and eventually the indentation 132 thereof. Since the position of the indentation is established by the manual tuning means, the frequency of the manually driven search receiver is that established by the manual tuning means.

From the foregoing disclosure, those skilled in the art will readily devise many additions and modifications of the present invention. It is therefore intended that the scope of the invention be not limited by the foregoing disclosure, but rather only by the appended claims.

The invention claimed is:

1. An article of manufacture comprising, in combination, a shaft, a clutch having first and second engageable members rotatably mounted relative to each other and means to orient the members in the same relative rotational relationship during periods of engagement, the first member being coupled to the shaft, manually actuatable means for continuous rotation coupled to the first member of the clutch, manually rotatable selection means mechanically coupled to the second member of the clutch, an electromechanical transducer having a first element mounted on the first member of the clutch and a second element mounted on the second member of the clutch confronting the path of the first element, said electromechanical transducer generating a pulse responsive to the translation of the two elements thereof past each other, means for generating a pulse responsive to one angular position of the shaft, and means electrically connected to the pulse generating means and to the electromechanical transducer for indicating the time interval between each pulse produced by the generating means and the pulse of the transducer occurring in the same rotational cycle of the shaft.

2. An article of manufacture comprising the elements of claim 1 wherein the electromechanical transducer comprises a magnetically permeable element mounted on the second member of the clutch, an assembly mounted on the first member including an electromagnet, a yoke forming a magnetic circuit having a gap confronting the path of the magnetically permeable element, and a coil disposed about the magnetic circuit.

3. An article of manufacture comprising, in combination, a clutch having first and second engageable members rotatably mounted relative to each other and means to orient the members in the same relative rotational relationship during periods of engagement, the first member being coupled to the shaft, manually actuatable means for continuous rotation coupled to the first member of the clutch, manually rotatable selection means mechanically coupled to the second member of the clutch and an electromagnet mounted to the first member of the clutch, an electromechanical transducer having a first magnetically permeable element mounted to the second member of the clutch including a yoke forming the magnetic gap confronting the path of the magnetically permeable element, means for generating a pulse responsive to one angular position of the shaft, an oscilloscope having a first deflection means and a second deflection means connected to the means for generating a pulse responsive to one angular position of the shaft, a pulse shaper including a differentiating circuit connected between the electromechanical transducer and the second deflection means of the oscilloscope, a sweep generator, and synchronizing means operatively associated with the sweep generator for producing a single sweep cycle of the sweep generator for each rotation of the shaft connected to the first deflection means of the oscilloscope.

4. A search receiver comprising, in combination, a tuning assembly having a rotatable shaft for frequency selection, a clutch having first and second engageable members rotatably mounted relative to each other and means to orient the members in the same relative rotational relationship during periods of engagement, the first member of said clutch being coupled to the shaft of the tuning assembly, manually actuatable means for continuous rotation coupled to the first member of the clutch for rotating the shaft, manually rotatable selection means mechanically coupled to the second member of the clutch, an electromechanical transducer having a first element mounted on the first member of the clutch and a second element mounted on the second member of the clutch confronting the path of the first element, said electromechanical transducer generating a pulse responsive to the translation of the two elements thereof past each other, an oscilloscope having a first deflection means and a second deflection means, the first deflection means being coupled to the output of the tuning assembly, means electrically connecting the electromechanical transducer to the first deflection means of the oscilloscope, a sweep generator electrically connected to the second deflection means of the oscilloscope and synchronized with the rotation rate of the shaft of the tuning assembly to produce a single sweep cycle for each rotation of the shaft.

5. A search receiver comprising the elements of claim 4 wherein the electromechanical transducer comprises a magnetically permeable element mounted on the first member of the clutch, a magnet having a yoke forming a magnetic gap mounted to the second member of the clutch confronting the path of the magnetically permeable element, and a coil disposed about the yoke.

6. A search receiver comprising the elements of claim 4 wherein the means connecting the electromechanical transducer to the first deflection means of the oscilloscope includes a pulse differentiating circuit.

7. An article of manufacture comprising, in combination, a shaft, support means for rotatably mounting the shaft, an axle aligned with the shaft and rotatably mounted to the support means, a clutch having first and second engageable members, the first member being a disc keyed coaxially about the axle and the second member being a cylindrical rotor coaxially mounted to the shaft confronting the disc, means mounted to one of the members for engaging the other member in the same relative angular relationship, a motor mechanically coupled to the rotor, manual rotation means mechanically coupled to the disc, and an electromechanical transducer having a first element mounted to the disc including a magnet, a magnetic yoke attached to the magnet forming a pair of pole pieces forming a magnetic gap confronting and adjacent to the periphery of the rotor, and a coil disposed about the yoke, and a second element in the form of a ferromagnetic bar mounted to the rotor at its periphery and transcribing a path confronting the gap of the first element when the rotor is rotating.

8. An article of manufacture comprising, in combination, a shaft, support means for rotatably mounting the shaft, an axle aligned with the shaft and rotatably mounted to the support means, a clutch having first and second engageable members, the first member being a disc keyed coaxially about the axle and the second member being a cylindrical rotor coaxially mounted to the shaft confronting the disc, means mounted to one of the members for engaging the other member in the same relative angular relationship, a motor mechanically coupled to the rotor, manual rotation means mechanically coupled to the disc, an electromechanical transducer having a first element mounted to the disc including a magnet, a magnetic yoke attached to the magnet forming a pair of pole pieces forming a magnetic gap confronting and adjacent to the periphery of the rotor, and a coil disposed about the yoke, and a second element in the form of a ferromagnetic bar mounted to the rotor at its periphery and traveling in a path confronting the gap of the first element, an electrically insulating ring secured to the disc on the side thereof remote from the rotor, a plurality of coaxial electrically conducting rings disposed on the electrically insulating member, and an electrically conducting contact brush mounted to the support member and abutting each electrically conducting ring, the electrically conducting rings being connected to the electromechanical transducer.

9. An article of manufacture comprising the elements of claim 7 wherein the means for engaging the clutch members in the same relative angular relationship comprises a bar disposed within an indentation of the disc and pivotally mounted to the rotor about an axis parallel to the axle, the disc being provided with a notch for engaging the bar, and means inversely responsive to the centrifugal force generated by the rotor for pivoting the bar toward the periphery of the disc.

References Cited in the file of this patent

UNITED STATES PATENTS

| | | |
|---|---|---|
| 2,208,648 | Schader | July 23, 1940 |
| 2,495,020 | Pifer | Jan. 17, 1950 |
| 2,565,876 | Nicholson | Aug. 28, 1951 |
| 2,639,374 | Goodrich | May 19, 1953 |
| 2,666,853 | O'Brien | Jan. 19, 1954 |
| 2,680,241 | Gridley | June 1, 1954 |
| 2,852,944 | Gaskill | Sept. 23, 1958 |
| 2,926,304 | Fromm | Feb. 23, 1960 |